(12) United States Patent
Secchi et al.

(10) Patent No.: US 8,016,578 B2
(45) Date of Patent: Sep. 13, 2011

(54) APPARATUS FOR VULCANIZATION AND MOULDING OF VEHICLE TYRES

(75) Inventors: Mario Secchi, Milan (IT); Pier Giuseppe Piantanida, Milan (IT); Maurizio Boiocchi, Milan (IT); Mauro Paolo Soatto, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 27 days.

(21) Appl. No.: 12/312,721

(22) PCT Filed: Nov. 27, 2006

(86) PCT No.: PCT/IB2006/003360
§ 371 (c)(1),
(2), (4) Date: May 22, 2009

(87) PCT Pub. No.: WO2008/065463
PCT Pub. Date: Jun. 5, 2008

(65) Prior Publication Data
US 2010/0303941 A1    Dec. 2, 2010

(51) Int. Cl.
*B29C 35/02*    (2006.01)
(52) U.S. Cl. ........................................................ 425/46
(58) Field of Classification Search .................. 425/46, 425/47
See application file for complete search history.

(56) References Cited

U.S. PATENT DOCUMENTS

| | | | |
|---|---|---|---|
| 3,337,918 A * | 8/1967 | Pacciarini et al. | 425/39 |
| 3,787,155 A * | 1/1974 | Zangl | 425/46 |
| 3,806,288 A * | 4/1974 | Materick | 425/46 |
| 3,901,632 A * | 8/1975 | Prosdocimi | 425/46 |
| 3,990,823 A * | 11/1976 | Le Moullac | 425/46 |
| 5,204,036 A | 4/1993 | MacMillan | |
| 5,234,326 A | 8/1993 | Galli et al. | |
| 5,639,326 A | 6/1997 | Soulalioux | |
| 6,949,213 B1 * | 9/2005 | Kata et al. | 425/46 |
| 7,025,581 B2 * | 4/2006 | Kata | 425/46 |
| 2004/0170715 A1 | 9/2004 | Kata | |
| 2006/0008547 A1 | 1/2006 | Ohara | |

FOREIGN PATENT DOCUMENTS

| | | |
|---|---|---|
| EP | 0 569 909 B1 | 11/1993 |
| EP | 0 653 293 B1 | 5/1995 |
| EP | 1 415 781 B1 | 5/2004 |
| WO | WO 2005/115710 A1 | 12/2005 |

* cited by examiner

*Primary Examiner* — James Mackey
(74) *Attorney, Agent, or Firm* — Finnegan, Henderson, Farabow, Garrett & Dunner, L.L.P.

(57) ABSTRACT

An apparatus for molding and vulcanization of tyres for vehicle wheels includes a vulcanization press and a vulcanization mold associated with the press. The apparatus includes a pair of plates and a plurality of mold sectors that are mutually movable between an open condition and a closed condition; at least one plurality of sector carriers designed to support the mold sectors and movable together with the sectors; and a plurality of guide means on which the plurality of sector carriers slide for movement of the mold sectors from the closed condition to the open condition and vice versa, at least part of the sector carriers having at least one spring device designed to exert a thrust action adapted to ensure sliding of the sector carrier on the guide element in a substantially parallel direction.

8 Claims, 3 Drawing Sheets

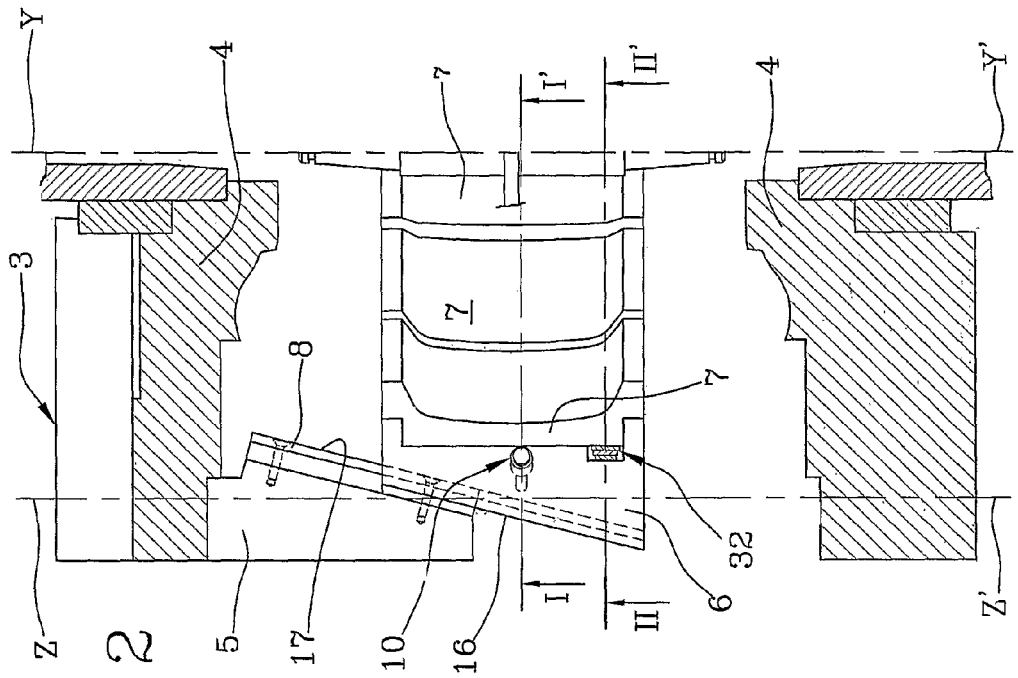
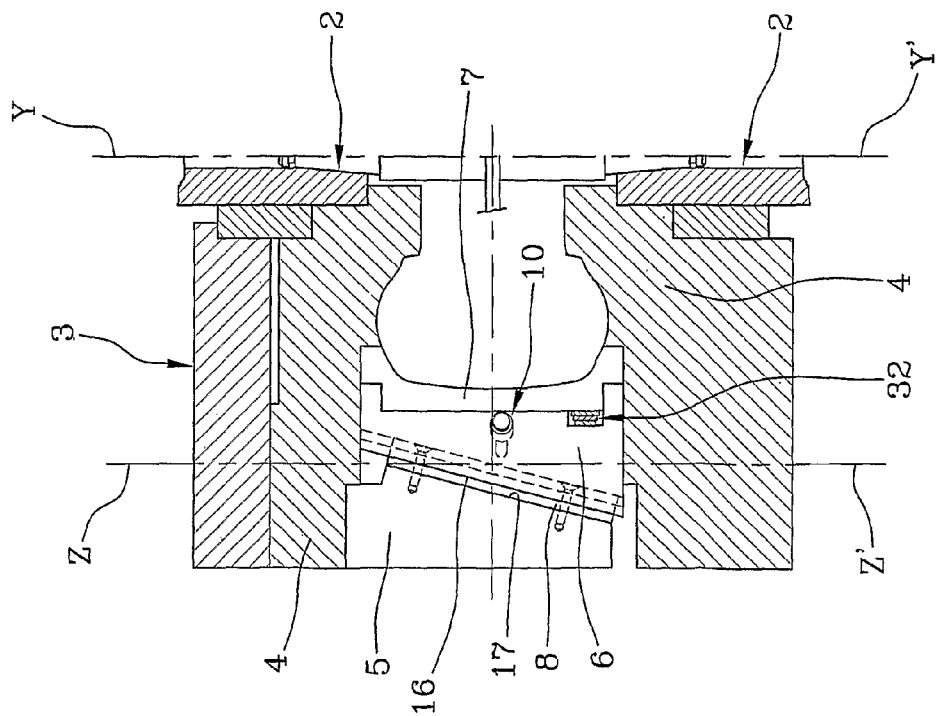

APPARATUS FOR VULCANIZATION AND MOULDING OF VEHICLE TYRES

CROSS REFERENCE TO RELATED APPLICATION

This application is a national phase application based on PCT/IB2006/003360, filed Nov. 27, 2006, the content of which is incorporated herein by reference.

BACKGROUND OF THE INVENTION

1. Field of the Invention

The present invention relates to an apparatus for moulding and vulcanisation of tyres for vehicle wheels.

2. Description of the Related Art

In a tyre production cycle it is provided that, subsequently to a building process during which a green tyre is obtained through assembling of the different tyre components, a moulding and vulcanisation process be carried, said process aiming at stabilising the tyre structure according to a desired geometric conformation usually characterised by a particular tread pattern.

To this end, the tyre is introduced into a vulcanisation apparatus of the type disclosed, for example, in U.S. Pat. No. 5,234,326 in the name of the same Applicant.

This apparatus comprises a pair of plates adapted to be moved close to each other and designed to operate on the tyre bead and sidewalls, and at least one crown of circumferentially distributed mould sectors radially movable close to each other to operate at the tyre tread band. In more detail, the plates and sectors are mutually movable between an open condition at which they are spaced apart to enable loading of the tyres under manufacture and a closed condition at which they define a moulding cavity having a geometric configuration matching the outer surfaces of the tyre to be obtained. For the moulding and vulcanisation operation, a vulcanisation bladder of elastomeric material filled with steam and/or other fluid at high temperature and pressure and placed inside the tyre enclosed in the moulding cavity, is provided to be inflated. In this way, the tyre is pushed against the inner walls of the moulding cavity and stabilised into the geometric conformation imposed on it, following cross-linking.

The moulding sectors, supported by appropriate sector carriers, are brought to the closed or open condition by a vulcanisation press that, acting by means of mechanical connections on the sector carriers, operates sliding of the latter on suitable guide elements and, as a result, movement of the mould sectors.

The Applicant has ascertained that the moulding and vulcanisation apparatuses as above described have some problems.

In fact, it was observed that during shifting of the mould sectors, above all towards the closed condition, sliding of the sector carriers on the respective guide elements, due to the weight of the sector carriers themselves, may involve jamming and uneven wear of the guide elements. In fact, the sector carriers by the action of their weight, tend to separate from the guide elements generating a relative slight rubbing between said parts.

The uneven wear of the guide elements may give rise to wrong positioning of the sector carriers in the closed condition and, as a result, of the mould sectors. Thus geometric and/or structural faults such as burr and step formation, can occur on the tyre tread band.

SUMMARY OF THE INVENTION

The Applicant has perceived that important improvements can be achieved if during movement from and towards the closed condition the sector carriers are guided in their sliding along the respective guide elements in such a manner that they can slide substantially parallel to the respective guide elements.

The Applicant has now found that the presence of moulding faults in the tread band of a tyre following the vulcanisation operation can be eliminated or in any case reduced by providing at least part of the sector carriers with at least one spring device designed to exert a thrust action adapted to ensure a substantially parallel sliding of each sector carrier on the respective guide element.

In a first aspect, the invention relates to an apparatus for moulding and vulcanisation of tyres for vehicle wheels, including a vulcanisation press and a vulcanisation mould associated with said press, said apparatus comprising:

a pair of plates adapted to be moved close to each other and designed to operate on the tyre bead and sidewalls;

a plurality of circumferentially distributed mould sectors adapted to be radially movable close to each other to operate at the tread band of the tyre; the plates and sectors being mutually movable between an open condition at which they are spaced apart to enable loading of the tyres being worked, and a closed condition at which they define a moulding cavity having a geometric configuration matching the outer surfaces of the tyre to be obtained;

a plurality of sector carriers, designed to support the mould sectors and movable together with said sectors;

actuating means operatively connected to the sector carriers and the vulcanisation press to operate movement of the mould sectors from the closed condition to the open condition and vice versa;

a plurality of guide elements on which said plurality of sector carriers slides for movement of the mould sectors from the closed condition to the open condition and vice versa;

wherein:

at least part of said sector carriers has at least one spring device designed to exert a thrust action capable of achieving sliding of each sector carrier on the respective guide element in a substantially parallel direction.

In particular, preferably each spring device is designed to exert a thrust action in the direction of the vertical central axis Z-Z' of the sector carrier so as to maintain the latter pressed against the respective guide elements.

Preferably, each sector carrier comprises two spring devices each of which is located close to a side end of the sector carrier so as to carry out balancing of the forces acting on the vertical central axis Z-Z' of the sector carrier.

Each spring device may be advantageously provided to be disposed so as to abut, at least on closure of the mould, against a spring device of the adjacent sector carrier.

According to a preferred aspect, each spring device is housed in a suitable seat formed in the sector carrier so as to project therefrom for abutment, at least on closure of the mould, against the spring device of the adjacent sector carrier.

Preferably each spring device comprises: a piston element and at least one spring adapted to exert a thrust action on said piston element.

In accordance with a preferred embodiment, at least part of the sector carriers has at least one second spring device designed to exert a thrust action directed radially outwards on the adjacent sector carrier.

Preferably, each sector carrier comprises two second spring devices located at the side ends of each sector carrier.

Advantageously, each second spring device comprises a plurality of leaf springs at least partly contained in a receiving seat formed in the sector carrier and fastened thereto in a removable manner.

BRIEF DESCRIPTION OF THE DRAWINGS

Further features and advantages will become more apparent from the detailed description of a preferred but not exclusive embodiment of an apparatus for moulding and vulcanisation of tyres for vehicle wheels in accordance with the present invention. This description will be set out hereinafter with reference to the accompanying drawings, given by way of non-limiting example, in which:

FIG. 1 is a diagrammatic section view of part of the apparatus of the invention with a mould portion in a closed condition to enable processing of the tyre to be vulcanised;

FIG. 2 is a diagrammatic section view of part of the apparatus of the invention with a mould portion in an open condition to enable removal of the vulcanised tyre;

DETAILED DESCRIPTION OF THE INVENTION

Figure 3:
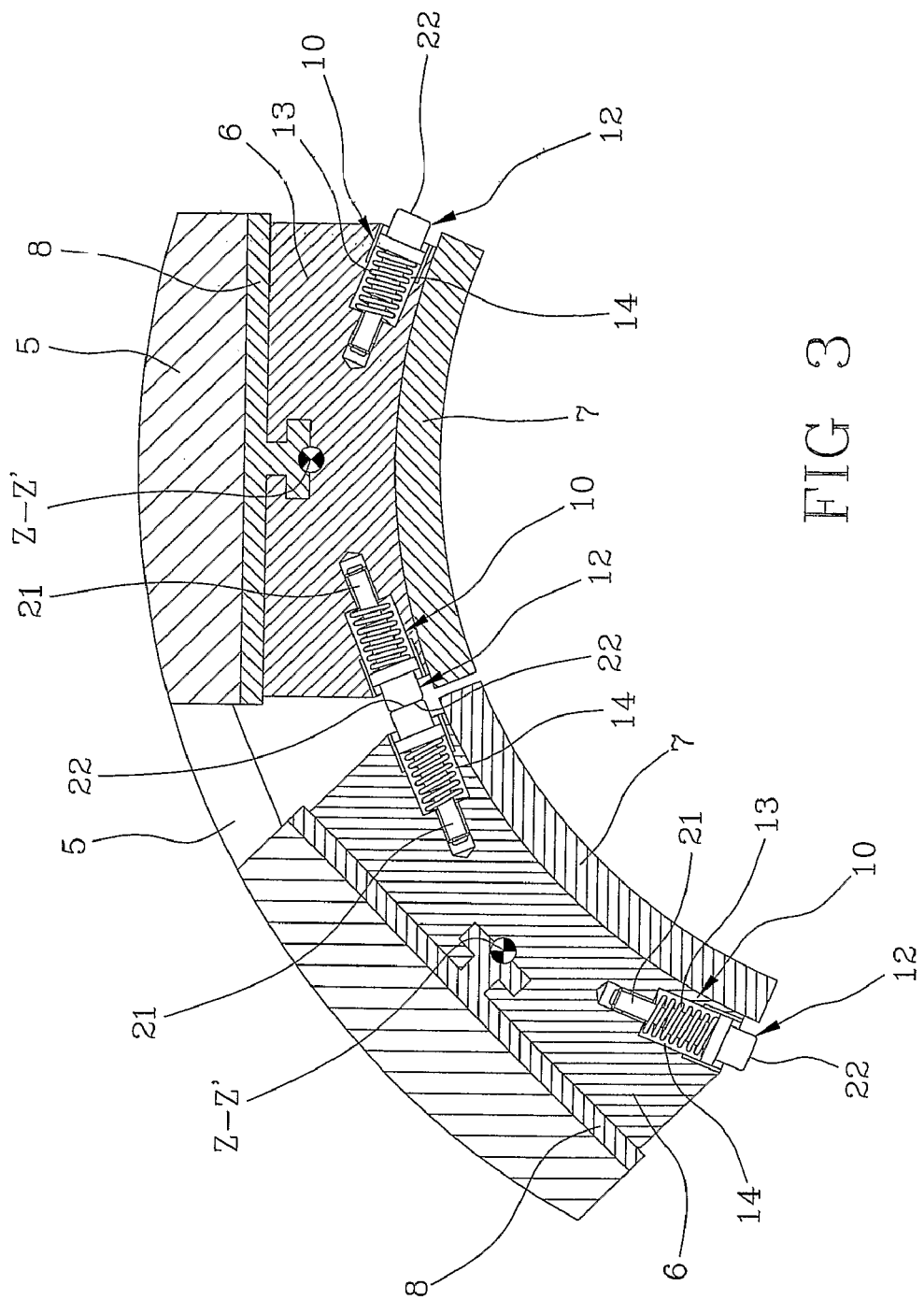
FIG. 3 shows a cross-section view along axis I-I' in FIG. 2 of a mould portion according to the present invention.

With reference to the drawings, an apparatus for moulding and vulcanisation of tyres for vehicle wheels in accordance with the present invention has been generally denoted with 1.

Apparatus 1 comprises a vulcanisation mould 2 associated with a vulcanisation press 3 only diagrammatically shown as it can be made in any manner convenient for a person skilled in the art. Mould 2 can be made up of two side portions 4 of annular conformation known as "plates" that are coaxially opposite along the central axis Y-Y' of the mould, axially movable relative to each other and substantially corresponding to the sidewalls of the tyre to be manufactured.

Disposed between said plates 4 is a central annular portion comprising a plurality of mould sectors 7 (usually in a number varying between four and ten), circumferentially disposed around the mould axis Y-Y'; a plurality of sector carriers 6, each provided to support several mould sectors 7 and a cone-shaped ring 5 at a radially outermost position with respect to the sector carriers 6 to support said sector carriers 6 in an axially slidable manner.

Sectors 7 are radially movable in both ways at right angles to the central vertical axis Y-Y' of the mould between a closed position (shown in FIG. 1) at which they define with the opposite plates 4 close to each other, a moulding cavity conforming in shape to the outer surfaces of the tyre to be obtained, and an open position (shown in FIG. 2) at which they are spaced apart, the plates 4 being spaced apart too, and allow removal of the vulcanised tyre.

The mould sectors 7 are designed to operate, when the mould is in a closed position, on the tread band of the tyre to define a so-called tread pattern in said band, and to this end they are provided, on their inner surfaces designed to come into contact with the tread band, with a plurality of surface ridges so as to generate longitudinal and/or transverse grooves delimiting the ribs and/or blocks of the desired tread pattern.

Plates 4 on the contrary and as previously mentioned, operate on the tyre sidewalls and, if raised portions are wished to be made thereon to define graphic identification elements of the tyre (such as the tyre trademark or size) for example, they are usually provided with corresponding cavities adapted to generate said raised portions.

The sector carriers 6 are jointly moved between a closed position and an open position by movement of the cone-shaped ring 5, in turn operatively connected to the vulcanisation press 3. In particular, the sector carriers 6 have an inclined surface 16 adapted to cooperate with a corresponding inclined surface 17 of the cone-shaped ring 5. A guide plate 8 is placed between the corresponding inclined surfaces 16 and 17, said guide plate 8 being secured in a removable manner to the inclined surface 17 of the cone-shaped ring 5 to enable sliding of the sector carrier 6 thereon. In accordance with the present invention, at least part of the sector carrier 6 plurality has at least one first spring device 10 designed to exert a thrust action in the direction of the vertical central axis Z-Z' of each sector carrier 6 to keep the latter pressed against the guide plates 8 of the cone-shaped ring 5, thereby ensuring a substantially parallel sliding of the sector carrier on the guide 8. Thus jamming of the sector carrier on the guide 8 is avoided during the closing movement of the mould, as well as uneven wear of the guide plates 8.

In the present specification by vertical central axis Z-Z', of the sector carrier it is intended a vertical axis parallel to the vertical axis Y-Y' of the mould and passing through the centre of gravity of the sector carrier itself.

According to a preferred embodiment shown in the drawings, each sector carrier 6 has two spring devices 10 disposed to a symmetric position relative to axis Z-Z' at the side ends of each sector carrier 6 so that said spring devices carry out balancing of the forces acting on the vertical central axis Z-Z' of the respective sector carrier 6; see FIG. 3.

Each first device 10 is such disposed that, on closing of the mould 2, it abuts against a spring device 10 of the adjacent sector carrier 6. In detail, each spring device 10 is housed in a suitable seat 14 formed in the sector carrier 6 in such a manner as to jut out with respect to said seat 14 for abutment, during movement of the mould from the open to the closed condition, against a spring device 10 of the adjacent sector carrier 6.

Each device 10 has a piston element 12 and at least one spring 13 designed to exert a thrust action on the piston element 12. In detail, the piston element 12 is provided with an abutment head 22 and a rod 21 at least partly slidable within the seat 14.

The spring 13 is a helical-type spring coaxially mounted around the rod 21 to exert a thrust action on the abutment head 22.

Figure 4:
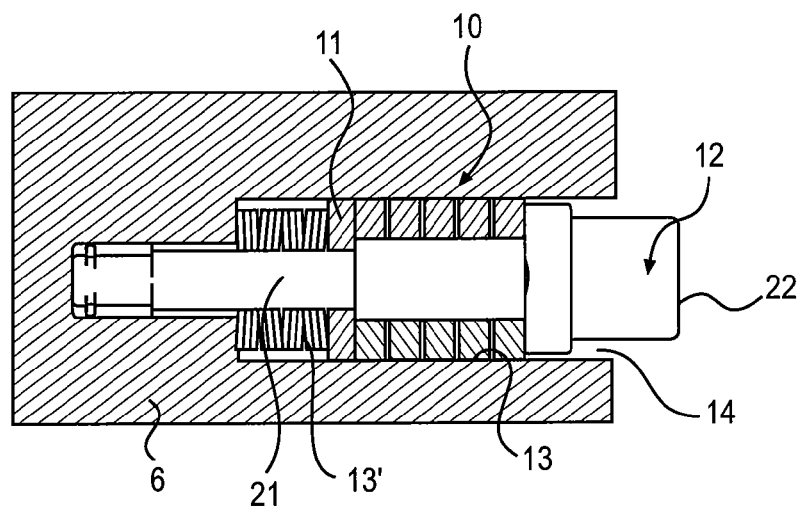
FIG. 4 is an enlarged view of an embodiment of the first spring device in accordance with the invention.

According to another embodiment, as shown in FIG. 4, the spring device 10 could have two helical springs 13, 13' disposed one after the other so as to differentiate the type of thrust that is wished to be applied to the piston element 12. In this case, an abutment ring 11 is interposed between the springs 13, 13'.

Alternatively, the spring device 10 could be represented by any device known to a person skilled in the art and capable of exerting a thrust action on the sector carrier 6 to maintain said sector carrier pressed against the guide plates 8 of the cone-shaped ring 5, thereby ensuring a substantially parallel sliding of the sector carrier 6 on the guide plate 8.

In another preferred embodiment of the present invention, to ensure a simultaneous radial closing and opening movement of the sector carriers 6, capable of being relied on to obtain a precise final positioning, at least part of said sector carriers 6 has at least one second spring device 32 designed to exert a thrust action directed radially outwards on the adjacent sector carrier 6.

Figure 5:
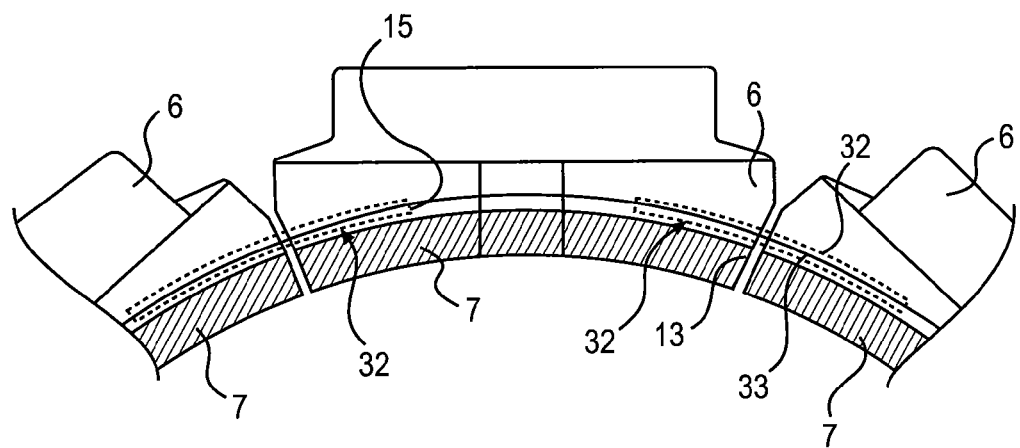
FIG. 5 is a cross-section view along axis II-II', in FIG. 2 of a mould portion according to the invention.

In detail, as shown in FIG. 5, each sector carrier 6 comprises two second spring devices 32 disposed in a corresponding location at the side ends of each sector carrier 6.

Each second spring device 32 is made up of a plurality of radially superposed leaf springs 33, depending on the spring features that are wished to be obtained.

Each plurality of leaf springs 33 is contained at least partly in a receiving seat 15, formed in the sector carrier to which it is fastened in a removable manner, and at least partly in the adjacent sector carrier on which it exerts a force directed in a radial direction.

Alternatively, the second spring devices 32 can be represented by any device commonly known to a person skilled in the art and capable of exerting a thrust action directed radially outwards on the adjacent sector carrier 6 with respect to the sector carrier 6 to which such a device is fastened.

The invention claimed is:

1. An apparatus for moulding and vulcanisation of tyres for vehicle wheels, comprising a vulcanisation press and a vulcanisation mould associated with said press, comprising:
    a pair of plates adapted to be moved toward each other and designed to operate on a tyre bead and sidewalls;
    a plurality of circumferentially distributed mould sectors adapted to be radially movable toward each other to operate at a tread band of the tyre, the plates and sectors being mutually movable between an open condition at which they are spaced apart to enable loading of the tyres being worked, and a closed condition at which they define a moulding cavity having a geometric configuration matching an outer surface of the tyre to be obtained;
    a plurality of sector carriers designed to support the mould sectors and movable together with said sectors;
    actuating means operatively connected to said sector carriers and said vulcanisation press to operate movement of said mould sectors from the closed condition to the open condition and vice versa; and
    a plurality of guide elements on which said plurality of sector carriers slide for movement of the mould sectors from the closed condition to the open condition and vice versa,
    wherein at least part of said sector carriers have at least one first spring device designed to exert a thrust action capable of achieving sliding of each sector carrier on the respective guide element in a substantially parallel direction, each first spring device being disposed such that the first spring device exerts said thrust action in the direction of a vertical central axis of its sector carrier so as to maintain the sector carrier against the guide elements.

2. The apparatus for moulding and vulcanisation of tyres for vehicle wheels as claimed in claim 1, wherein each sector carrier comprises two first spring devices each of which is located at a side end of the sector carrier.

3. The apparatus for moulding and vulcanisation of tyres for vehicle wheels as claimed in claim 2, wherein each first spring device is disposed such that each first spring device abuts, on closure of the mould, against the first spring device of an adjacent sector carrier.

4. The apparatus for moulding and vulcanisation of tyres for vehicle wheels as claimed in claim 3, wherein each first spring device is housed in a seat formed in the sector carrier in such a manner as to jut out with respect to said seat for abutment on closure of the mould, against the first spring device of the adjacent sector carrier.

5. The apparatus for moulding and vulcanisation of tyres for vehicle wheels as claimed in claim 4, wherein each first spring device comprises a piston element and at least one spring adapted to exert a thrust action on said piston element.

6. The apparatus for moulding and vulcanisation of tyres for vehicle wheels as claimed in claim 1, wherein at least part of said sector carriers have at least one second spring device designed to exert a thrust action directed radially outward on an adjacent sector carrier.

7. The apparatus for moulding and vulcanisation of tyres for vehicle wheels as claimed in claim 6, wherein each sector carrier comprises two second spring devices, each located at a side end of a respective sector carrier.

8. The apparatus for moulding and vulcanisation of tyres for vehicle wheels as claimed in claim 6, wherein each second spring device comprises a plurality of leaf springs at least partly contained in a receiving seat and fastened thereto in a removable manner.

* * * * *